United States Patent
Sonwane et al.

(10) Patent No.: US 12,547,301 B2
(45) Date of Patent: Feb. 10, 2026

(54) MAINTAINING STATE BETWEEN WEB APPLICATIONS

(71) Applicant: SAP SE, Walldorf (DE)

(72) Inventors: Tejram Jagannath Sonwane, Bangalore (IN); Ankit Kumar, Bangalore (IN); Swati Krishna Setty, Bangalore (IN)

(73) Assignee: SAP SE, Walldorf (DE)

( * ) Notice: Subject to any disclaimer, the term of this patent is extended or adjusted under 35 U.S.C. 154(b) by 214 days.

(21) Appl. No.: 18/461,699

(22) Filed: Sep. 6, 2023

(65) Prior Publication Data
US 2025/0077050 A1    Mar. 6, 2025

(51) Int. Cl.
| | | |
|---|---|---|
| *G06F 3/0484* | (2022.01) | |
| *G06F 9/451* | (2018.01) | |
| *H04L 67/02* | (2022.01) | |
| *H04L 67/148* | (2022.01) | |

(52) U.S. Cl.
CPC ............ *G06F 3/0484* (2013.01); *G06F 9/451* (2018.02); *H04L 67/02* (2013.01); *H04L 67/148* (2013.01)

(58) Field of Classification Search
CPC ..... H04L 67/142; H04L 67/148; H04L 67/02; G06F 3/0484; G06F 9/452; G06F 3/0481; G06F 16/9577; G06F 16/904; G06F 9/451; G06F 9/485; G06F 9/44521; G06F 16/954

See application file for complete search history.

(56) References Cited

U.S. PATENT DOCUMENTS

| | | | |
|---|---|---|---|
| 11,144,336 B1 * | 10/2021 | Hu ........................ | G06F 9/451 |
| 11,886,845 B1 * | 1/2024 | Barbato ................... | G06F 8/38 |
| 2005/0154872 A1 * | 7/2005 | McGrew ............... | H04L 9/3226 |
| | | | 713/150 |
| 2012/0131441 A1 | 5/2012 | Jitkoff et al. | |
| 2013/0145423 A1 * | 6/2013 | Cooper .................. | H04L 63/20 |
| | | | 726/1 |
| 2017/0097973 A1 * | 4/2017 | Iannaccone ......... | H04L 67/1095 |
| 2017/0171318 A1 * | 6/2017 | Levithan ................ | G06F 11/07 |
| 2019/0268156 A1 | 8/2019 | Delmas et al. | |
| 2021/0117056 A1 * | 4/2021 | Kuo ....................... | G06F 3/0484 |
| 2021/0289036 A1 * | 9/2021 | Van Rotterdam ....... | H04L 67/02 |

OTHER PUBLICATIONS

The EP Search Report dated Jan. 20, 2025, EP Application No. 24193479.3. 10 pg.

* cited by examiner

*Primary Examiner* — Nicholas Ulrich
(74) *Attorney, Agent, or Firm* — Fountainhead Law Group, PC

(57) ABSTRACT

State can be maintained between web applications such as a lightweight and a classic version of a web application. A lightweight viewer of a web application providing a visualization dashboard is run in a web browser. User inputs that modify the visualization dashboard are obtained. Then user input for navigation to a classic viewer of the web application is obtained. The classic viewer is navigated to in the web browser. Then the visualization dashboard of the classic viewer is modified to the modified state from the lightweight viewer without user input to the classic viewer.

20 Claims, 9 Drawing Sheets

MAINTAINING STATE BETWEEN WEB APPLICATIONS

BACKGROUND

The present disclosure pertains to web application and in particular to maintaining state between web application.

Web applications are software programs that run on a web browser. Web applications are often stored on a remote system and delivered over the Internet or another network. One example of a web application is a data analytics cloud application provided by a cloud platform.

In some situations, two web applications can provide similar functionality in general but one applications may provide more functionality and complexity compared to another, often with the draw back of being slower or requiring additional computing resources. For instance, a "lightweight" data analytics web application may provide similar functionality to a "classic" or full functionality web application but may lack certain specific features or abilities (e.g., geographic charts). However, the lightweight web application may run quicker (e.g., when loading and opening dashboards) compared to a classic version of the web application. In this example, the lightweight application and classic application are two different software applications but may be thought of as two different version of the same application and there is overlap in functionality and both application may access the same data from the same back-end server.

When a user opens the lightweight version of the application they may perform some operations and later realize that they want to access features only available in the classic or full version of the application. In certain systems, the user may navigate to the classic web application but they may lose the current state of the software as they were using it in the lightweight version.

This may be problematic when the user needs to reperform operations to get back to the state they were in and more problematic if the user cannot remember the steps that they took in the lightweight version.

The present disclosure addresses these issue and others, as further described below.

SUMMARY

Some embodiments provide a computer system comprising one or more processors and one or more machine-readable medium coupled to the one or more processors. The one or more machine-readable medium storing computer program code comprising sets of instructions executable by the one or more processors to run a lightweight viewer of a web application in a web browser, the lightweight viewer providing a first user interface presenting a visualization dashboard including one or more visualizations of data. The computer program code further comprising sets of instructions executable by the one or more processors to obtain one or more user inputs that modify the visualization dashboard of the lightweight viewer to a modified state. The computer program code further comprising sets of instructions executable by the one or more processors to obtain user input for navigation to a classic viewer of the web application, the classic viewer providing one or more functions or abilities that are not provided by the lightweight viewer. The computer program code further comprising sets of instructions executable by the one or more processors to navigate to the classic viewer in the web browser, the classic viewer providing a second user interface presenting the visualization dashboard including the one or more visualizations of data. The computer program code further comprising sets of instructions executable by the one or more processors to modify the visualization dashboard of the classic viewer to the modified state based on the navigation from the lightweight viewer to the classic viewer and without user input to the classic viewer to modify the visualization dashboard to the modified state.

Some embodiments provide a non-transitory computer-readable medium storing computer program code. The computer program code comprises sets of instructions to run a lightweight viewer of a web application in a web browser, the lightweight viewer providing a first user interface presenting a visualization dashboard including one or more visualizations of data. The computer program code further comprises sets of instructions to obtain one or more user inputs that modify the visualization dashboard of the lightweight viewer to a modified state. The computer program code further comprises sets of instructions to obtain user input for navigation to a classic viewer of the web application, the classic viewer providing one or more functions or abilities that are not provided by the lightweight viewer. The computer program code further comprises sets of instructions to navigate to the classic viewer in the web browser, the classic viewer providing a second user interface presenting the visualization dashboard including the one or more visualizations of data. The computer program code further comprises sets of instructions to modify the visualization dashboard of the classic viewer to the modified state based on the navigation from the lightweight viewer to the classic viewer and without user input to the classic viewer to modify the visualization dashboard to the modified state.

Some embodiments provide a computer-implemented method comprising running a lightweight viewer of a web application in a web browser, the lightweight viewer providing a first user interface presenting a visualization dashboard including one or more visualizations of data, obtaining one or more user inputs that modify the visualization dashboard of the lightweight viewer to a modified state, obtaining user input for navigation to a classic viewer of the web application, the classic viewer providing one or more functions or abilities that are not provided by the lightweight viewer, navigating to the classic viewer in the web browser, the classic viewer providing a second user interface presenting the visualization dashboard including the one or more visualizations of data, and modifying the visualization dashboard of the classic viewer to the modified state based on the navigation from the lightweight viewer to the classic viewer and without user input to the classic viewer to modify the visualization dashboard to the modified state.

The following detailed description and accompanying drawings provide a better understanding of the nature and advantages

BRIEF DESCRIPTION OF THE DRAWINGS

The following detailed description and accompanying drawings provide a better understanding of the nature and advantages of the present disclosure.

DETAILED DESCRIPTION

Figure 1:
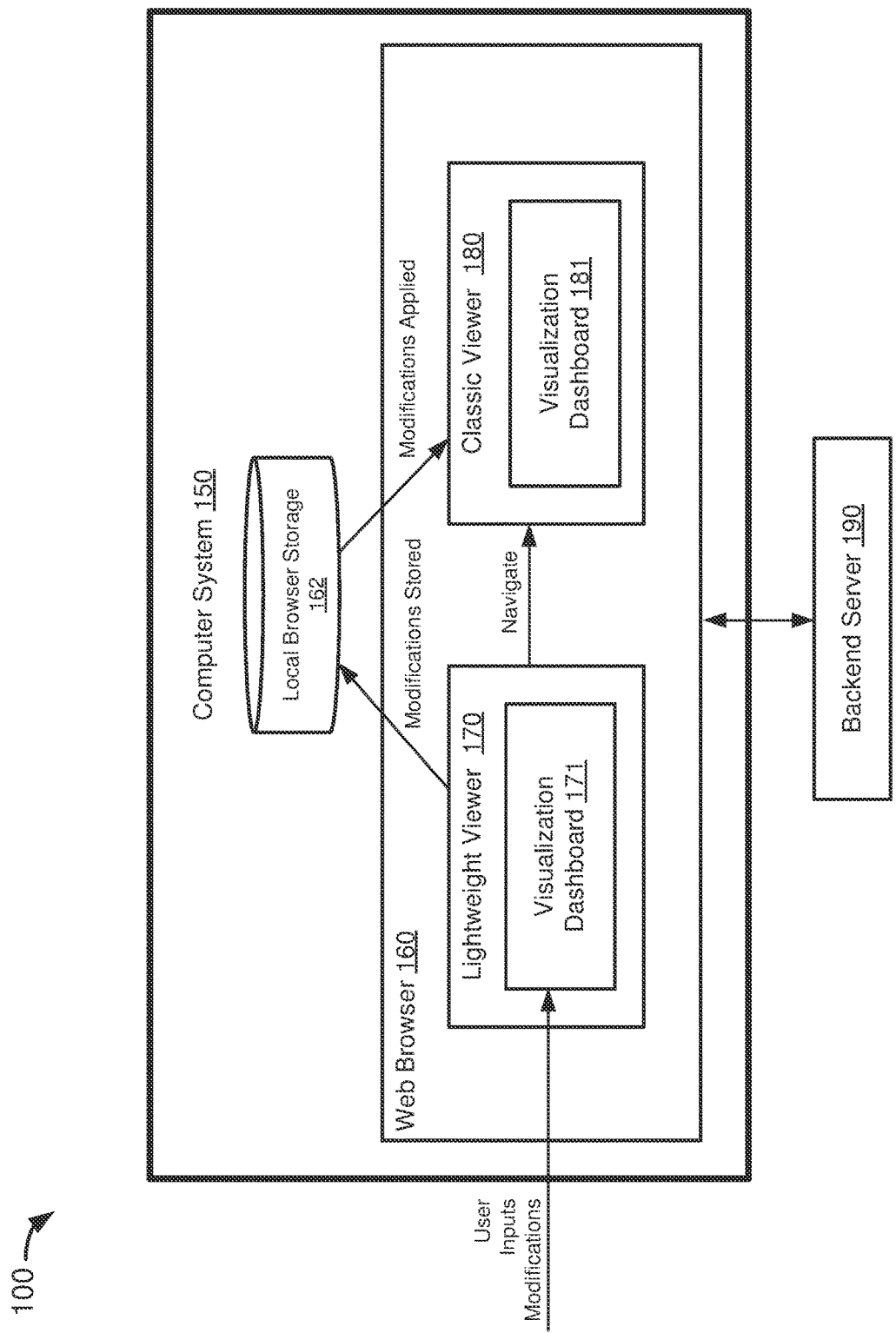
FIG. 1 shows a diagram of a computer system maintaining state between a first web application and a second web application, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated. These terms, as used herein, may simply be used for differentiation between different objects or elements.

As mentioned above, in some situations, two web applications can provide similar functionality in general but one applications may provide more functionality and complexity compared to another, often with the draw back of being slower or requiring additional computing resources. For instance, a "lightweight" data analytics web application may provide similar functionality to a "classic" or full functionality web application but may lack certain specific features or abilities (e.g., geographic charts). However, the lightweight web application may run quicker (e.g., when loading and opening dashboards) compared to a classic version of the web application. In this example, the lightweight application and classic application are two different software applications but may be thought of as two different version of the same application and there is overlap in functionality and both application may access the same data from the same backend server.

When a user opens the lightweight version of the application they may perform some operations and later realize that they want to access features only available in the classic or full version of the application. In certain systems, the user may navigate to the classic web application but they may lose the current state of the software as they were using it in the lightweight version.

This may be problematic when the user needs to reperform operations to get back to the state they were in and more problematic if the user cannot remember the steps that they took in the lightweight version.

The present disclosure provides techniques for maintaining state between web applications to address this issues and others. In the description below, some examples of these techniques are described with respect to a data analytics web application. However, the disclosure covers other types of web applications and the techniques may be implemented across various others types of web applications.

FIG. 1 shows a diagram 100 of a computer system 150 maintaining state between a first web application and a second web application, according to an embodiment. The computer system 150 may be a user device such as a personal computer, laptop computer, smartphone, and so on. Here, the two applications are a lightweight viewer 170 and a classic viewer 180 which are both web applications running on a web browser 160 of the computer system 150. The computer system 150 includes a local browser storage 162 for storing data of the web browser 160. The web applications 170 and 180 may be provided by a backend server 190 that provided the data for these web applications.

In this embodiment, the lightweight viewer 170 and classic viewer 160 are different versions of a data analytics web application with which users can create interactive dashboards, reports, and charts to visualize data from multiple sources. Users can create a collection of interactive visualizations, charts, and other components that help themselves and other users analyze and present the data in a meaningful way.

The data analytics web application provides the classic viewer web application 180 to view visualization dashboards. The Classic viewer 180 supports all functionalities of the web application but in some situations it may take a considerable amount of time to load and open dashboards in the user's computer system 150.

To resolve performance problems, the web application also provides the lightweight viewer web application 170 SAC also provides another viewer application called the lightweight viewer 170 (LWV) which may load and open visualization dashboards faster compared to the classic viewer 180. The computer system 150 may run the lightweight viewer of the web application in a web browser 160, where the lightweight viewer provides a first user interface presenting a visualization dashboard including one or more visualizations of data, as described herein.

Figure 3:
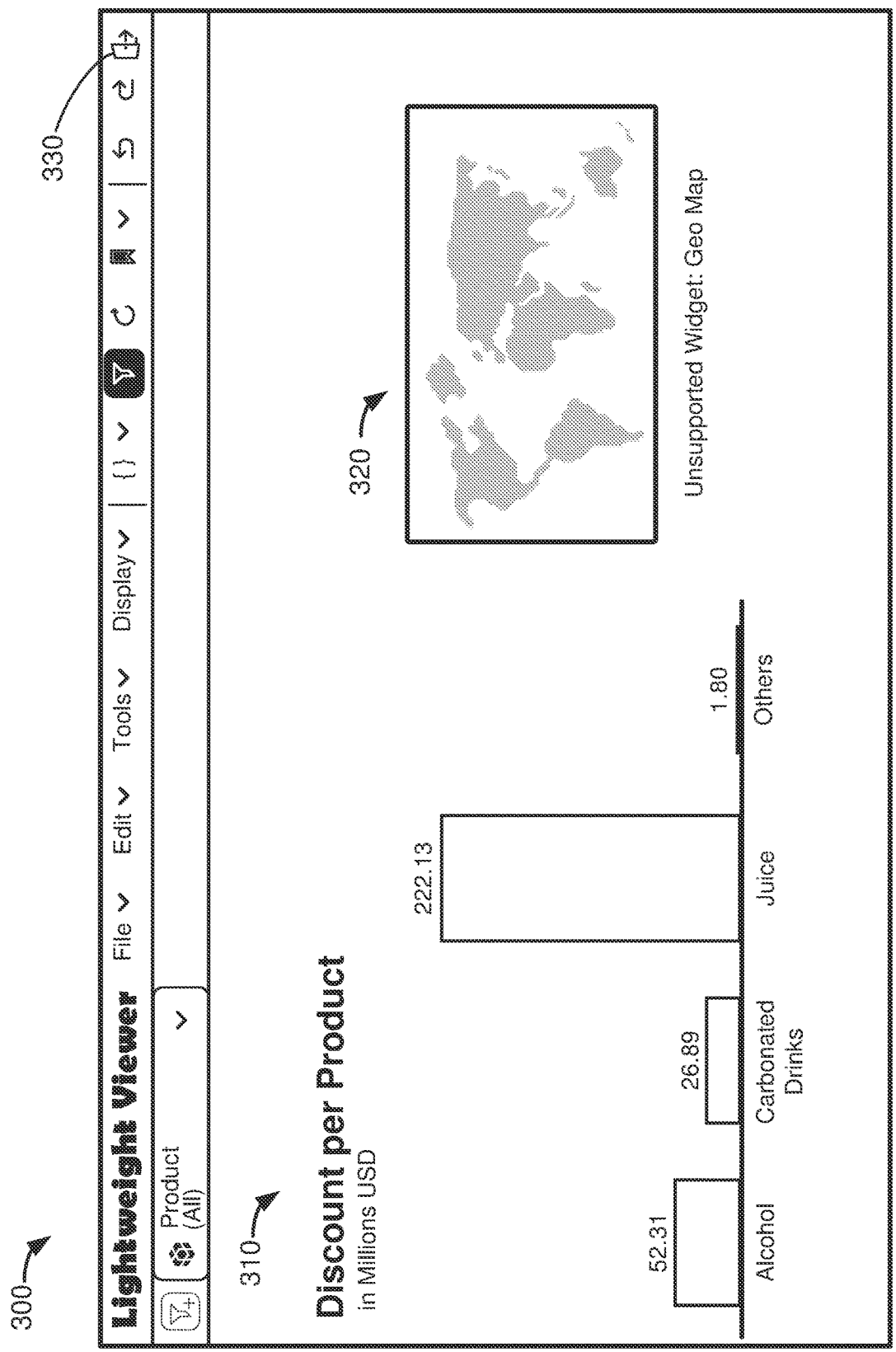
FIG. 3 shows a default state of a lightweight web application user interface including a dashboard, according to an embodiment.
Figure 4:
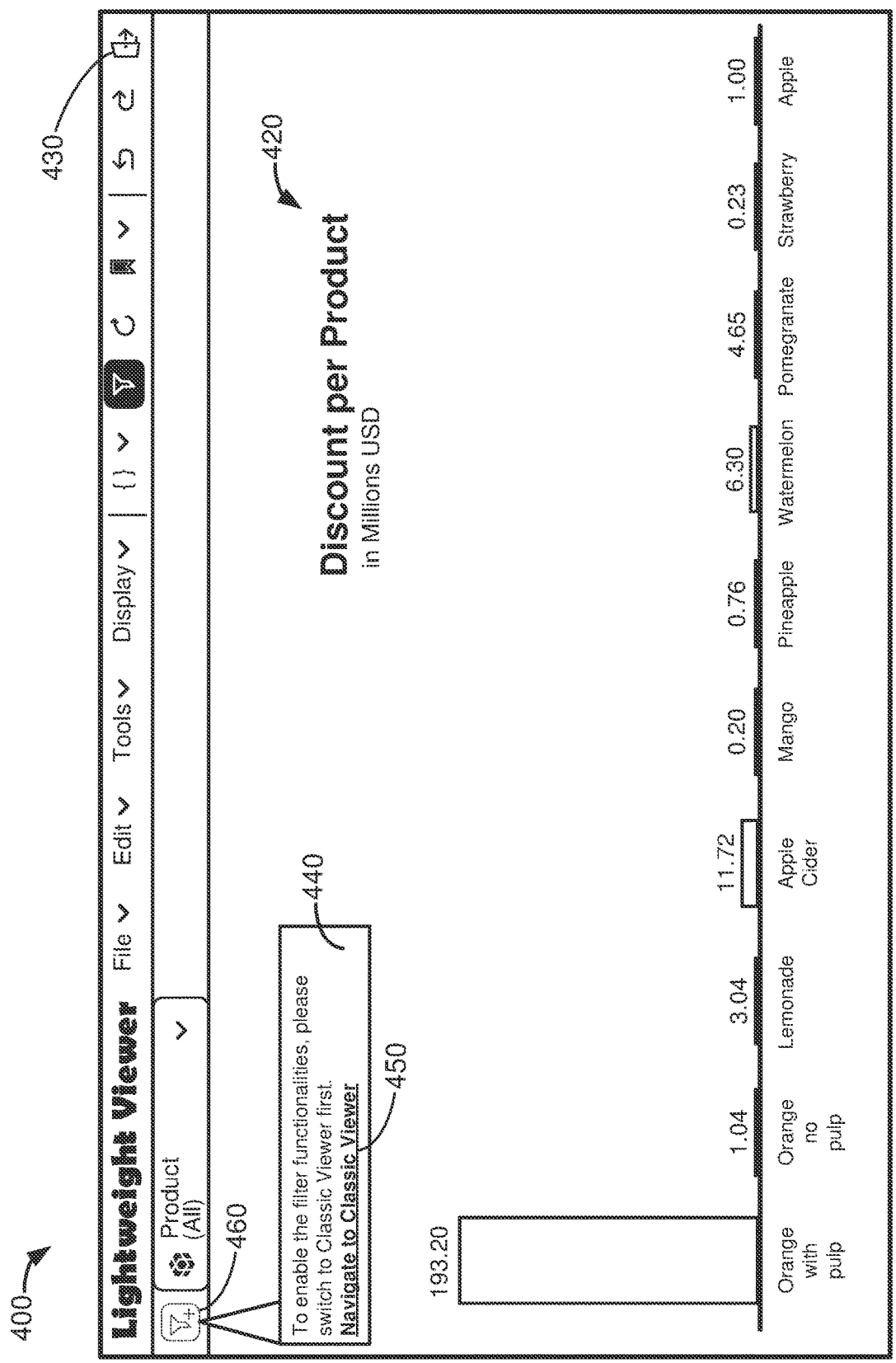
FIG. 4 shows a modified state of a lightweight web application user interface including a dashboard, according to an embodiment.

The lightweight viewer 170 is designed to be "lighter" and quicker and to achieve this it does not support the "heavy" (i.e., computationally resource intensive) functionalities of the classic viewer 180. Examples of such heavy functionalities that are not supported by the lightweight viewer 170 include geographic charts (e.g., overlaid on a map) and linked analysis and linked interactions between visualizations in the dashboard. Thus, the classic viewer provides one or more functions or abilities that are not provided by the lightweight viewer. Examples of notifications or indications of such heavy functionalities that are not provided by the lightweight viewer are shown in FIG. 3 and FIG. 4 and described below. As an example, a placeholder image may be shown for an unsupported widget such as geographic chart. FIG. 3 shows a placeholder image 320. As another example, non-supported functionalities may be disabled (e.g., as indicated by dashed lines or being grayed out) and when the user clicks, taps, hovers over, or otherwise selects the button for that functionality, the user interface may present a message (e.g., a tooltip) indicating that the heavy functionality is not supported. As an example, filtering may be a heavy functionality and a message 440 may be displayed in a lightweight viewer when the user selects the filter button 460 as shown in FIG. 4. These examples are further described below.

Even if a visualization dashboard includes heavy functionalities that are not supported by the lightweight viewer 170, the dashboard may still be loaded and opened by the lightweight viewer 170 without loading visualizations that requiring the heavy functionality. However when a dashboard contains heavy features like a geographic chart and the user opens the same dashboard in the lightweight viewer 170, the user may later realize that these features are not loaded but that they need these features for further analysis. For this reason, the lightweight viewer 170 provides a navigation feature where users can navigate to the classic viewer 180 to get the full functionalities of the story. Accordingly, the web browser 160 may obtain user input for navigation to a classic viewer of the web application and navigate to the classic viewer 180 in the web browser 160. The classic viewer 180 may provide a second user interface presenting the visualization dashboard including the one or more visualizations of data. Examples of navigation features are shown in FIG. 4. As an example, FIG. 4 shows a navigation button 430 to navigate to the classic viewer. The icon of the button is an open door with an arrow to indicate that the user may select this function to navigate away. As another example of a navigation feature, a message, notification, or indication may include a hyperlink 450 as shown in FIG. 4.

When a user opens a story in the lightweight viewer 170, it opens the dashboard with the default state as it was designed. The web browser 160 may then obtain one or more user inputs that modify the visualization dashboard of the lightweight viewer to a modified state. That is, the user may provide inputs that modify the state of the dashboard. For example, the user may perform operations like applying filters for visualizations of data, drilling down the hierarchical dimensions of the data, and so on. The dashboard state may get changed when a user performs such operations. An example of a user opening a dashboard in a default state is shown in FIG. 3 and an example of a dashboard in a modified stated based on user inputs is shown in FIG. 4.

Figure 5:
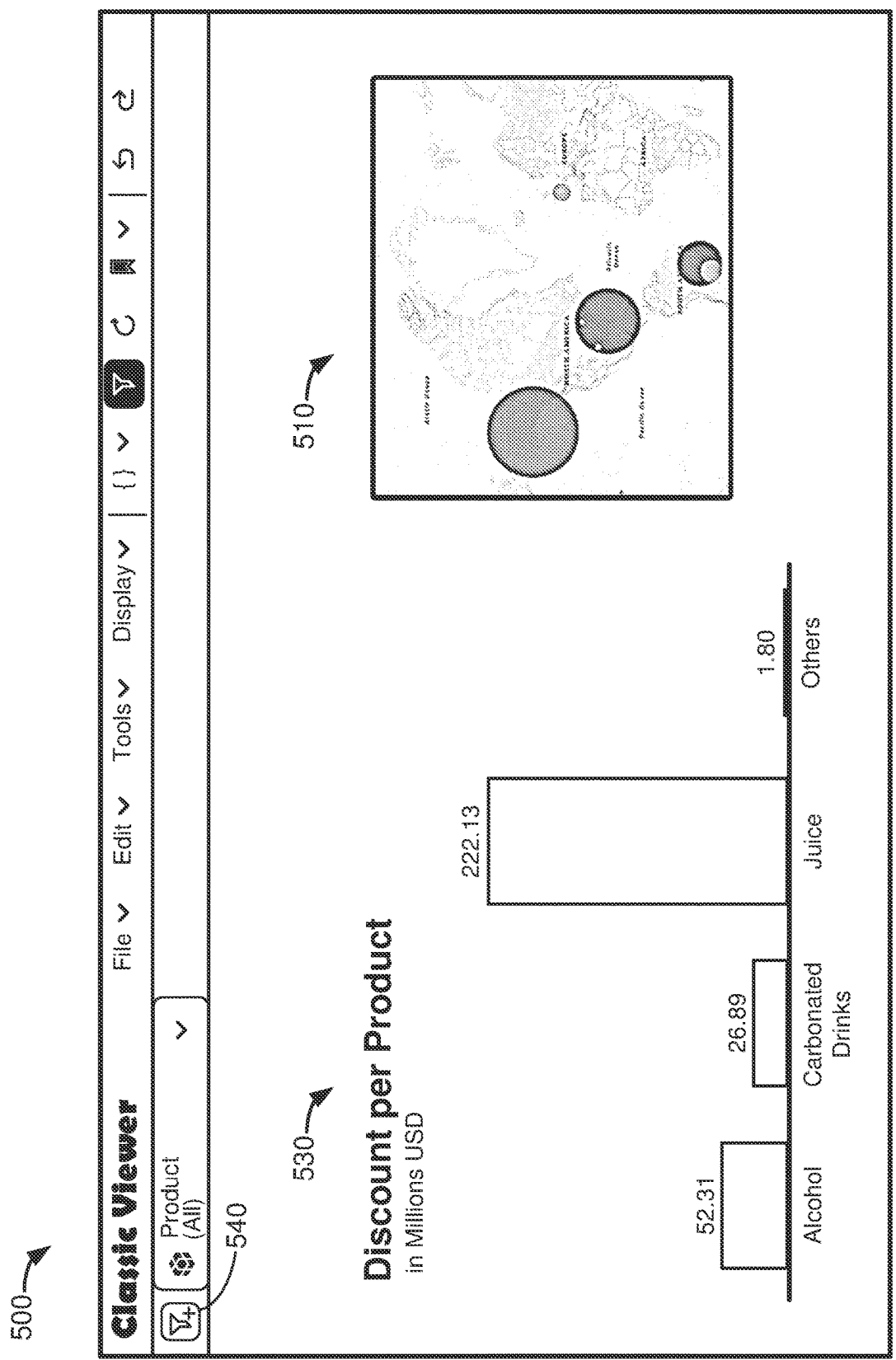
FIG. 5 shows a default state of a classic web application user interface including a dashboard, according to an embodiment.
Figure 6:
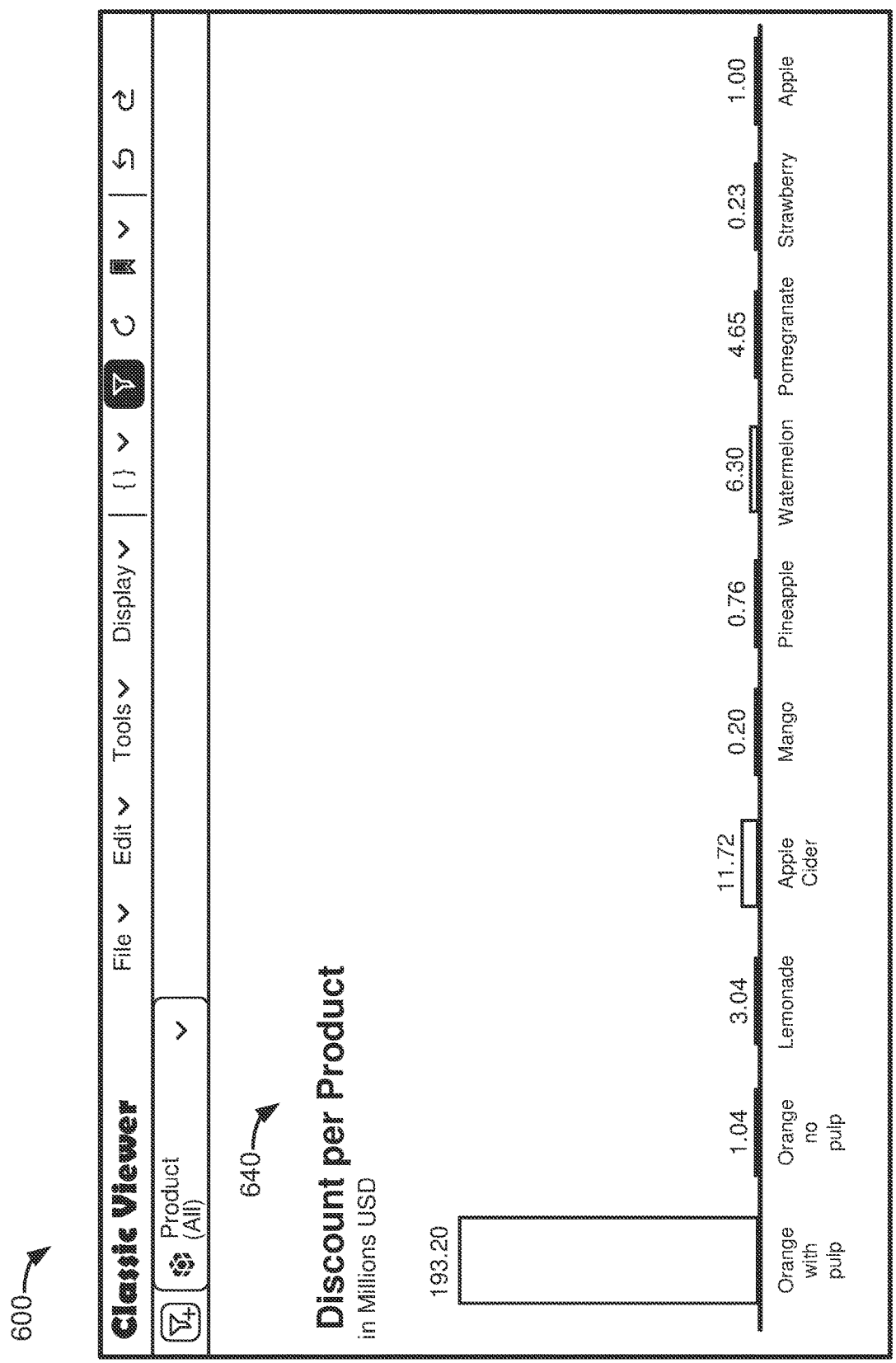
FIG. 6 shows a modified state of a classic web application user interface including a dashboard, according to an embodiment.

In certain prior web applications, if the user navigated to the classic viewer 180, the dashboard would open in the default state again and the user would lose the current story's context. An example of a classic viewer 180 loading a dashboard in the default state is shown in FIG. 5. An example of a classic viewer 180 loading the dashboard in the same modified state as the lightweight viewer is shown in FIG. 6.

The present disclosure provides techniques for maintaining state between web applications to address this issue and others. In this embodiment, the two viewers (lightweight viewer 170 and classic viewer 180) are two different web applications working on the same data. In other words, they are different versions of the same application, a lightweight version and a classic version. When the user navigates from lightweight viewer 170 to the classic viewer 180, the web browser 160 may close the lightweight viewer 170 application and open the classic viewer 180 application in the same browser window. Before closing the lightweight viewer 170 application, the web browser 160 may capture the change in the dashboard's state (e.g., the "delta") and store it in the local browser storage 162. When the classic viewer 180 application is opened, the web browser 160 may retrieve the default dashboard state from the backend server 190 and apply the delta which is kept by lightweight viewer 170 in the browser storage 162. That is, the web browser 160 may modify the visualization dashboard of the classic viewer to the modified state based on the navigation from the lightweight viewer to the classic viewer and without user input to the classic viewer to modify the visualization dashboard to the modified state. Advantageously, the dashboard context is maintained when switching from the lightweight viewer 170 to the classic viewer 180. As soon as delta is applied to the dashboard, it is cleared and deleted from the browser storage 162.

Figure 2:
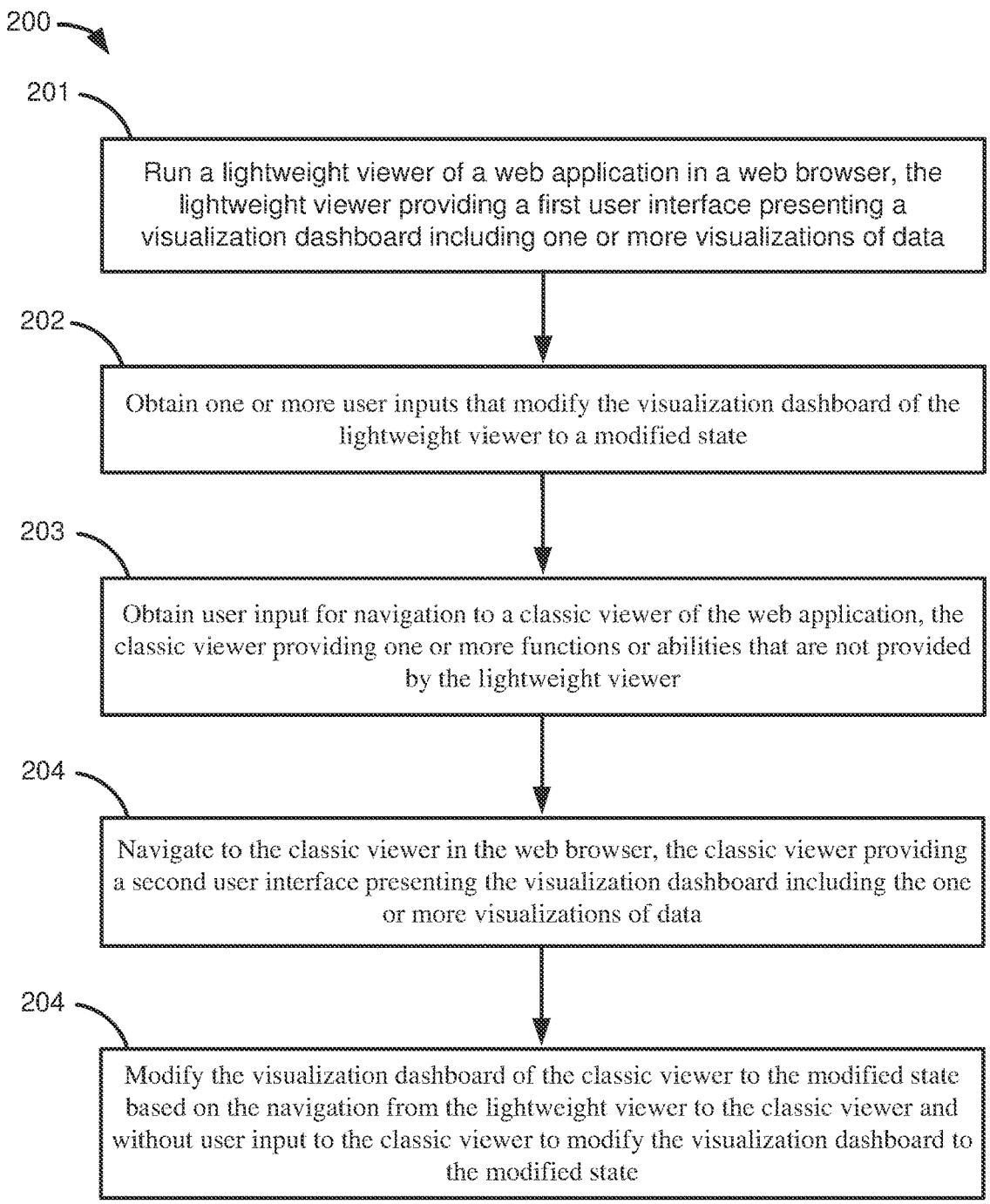
FIG. 2 shows a flowchart of a method for maintaining state between a first web application an a second web application, according to an embodiment.

FIG. 2 shows a flowchart 200 of a method for maintaining state between a first web application an a second web application, according to an embodiment. The method of FIG. 2 may be performed by the computer system 150 described above with respect to FIG. 1.

At 201, run a lightweight viewer of a web application in a web browser, the lightweight viewer providing a first user interface presenting a visualization dashboard including one or more visualizations of data. As previously mentioned, data analytic applications may enable users to create interactive dashboards, reports, and charts to visualize data from multiple sources that help the user analyze and present their data in a meaningful way. In some embodiments, the first user interface of the lightweight viewer includes an indication that a specific functionality is not available in the lightweight viewer. For example, a button or menu item for a particular functionality may be drawn with dashed lines or otherwise "grayed out" to indicate that the functionality is not available. Examples of visualization dashboards are provided in FIGS. 3-6 and are described below. In particular, FIGS. 3 and 4 provide examples of a lightweight viewer.

At 202, obtain one or more user inputs that modify the visualization dashboard of the lightweight viewer to a modified state. As examples, the user inputs may include inputs to apply filters to the visualizations within the dashboard or inputs to drill down within hierarchical data presented within the visualizations.

In some embodiments, the one or more visualizations of data in the visualization dashboard are defined by a visualization definition, and wherein the one or more user inputs that modify the visualization dashboard to the modified state also modify the visualization definition to a modified visualization definition.

At 203, obtain user input for navigation to a classic viewer of the web application, the classic viewer providing one or more functions or abilities that are not provided by the lightweight viewer. In some embodiments, the navigation to the classic viewer in the web browser includes an indication in a uniform resource locator that the navigation is from the lightweight viewer. For example, the navigation may involve adding URL parameters, such as 'navigatefromlwv=true', to inform the classic viewer that the user has opened it by navigating from the lightweight viewer.

In some embodiments, the navigation to the classic viewer in the web browser includes additional parameters of the visualization dashboard. In some embodiments the additional parameters may include a page identifier that identifies are particular page within the visualization dashboard.

At 204, navigate to the classic viewer in the web browser, the classic viewer providing a second user interface presenting the visualization dashboard including the one or more visualizations of data. Examples of visualization dashboards are provided in FIGS. 3-6 and are described below. In particular, FIGS. 5 and 6 provide examples of a classic viewer.

At 205, modify the visualization dashboard of the classic viewer to the modified state based on the navigation from the lightweight viewer to the classic viewer and without user input to the classic viewer to modify the visualization dashboard to the modified state.

In some embodiments, the method for maintaining state may further include steps to determine a delta state object by comparing the modified visualization definition to the visualization definition, retrieve, by the lightweight viewer, an encryption key from a server for the web application, encrypt, by the lightweight viewer, the delta state object using the encryption key to obtain an encrypted delta state object, store, by the lightweight viewer, the encrypted delta state object in a local browser storage, retrieve, by the classic viewer, a decryption key from the server for the web application, retrieve, by the classic viewer, the encrypted delta state object from the local browser storage, and decrypt, by the classic viewer, the encrypted delta state object using the decryption key to obtain the delta state object, wherein the modification of the visualization dashboard of the classic viewer to the modified state based on the navigation from the lightweight viewer to the classic viewer is based on the delta state object.

Example

Figure 7:
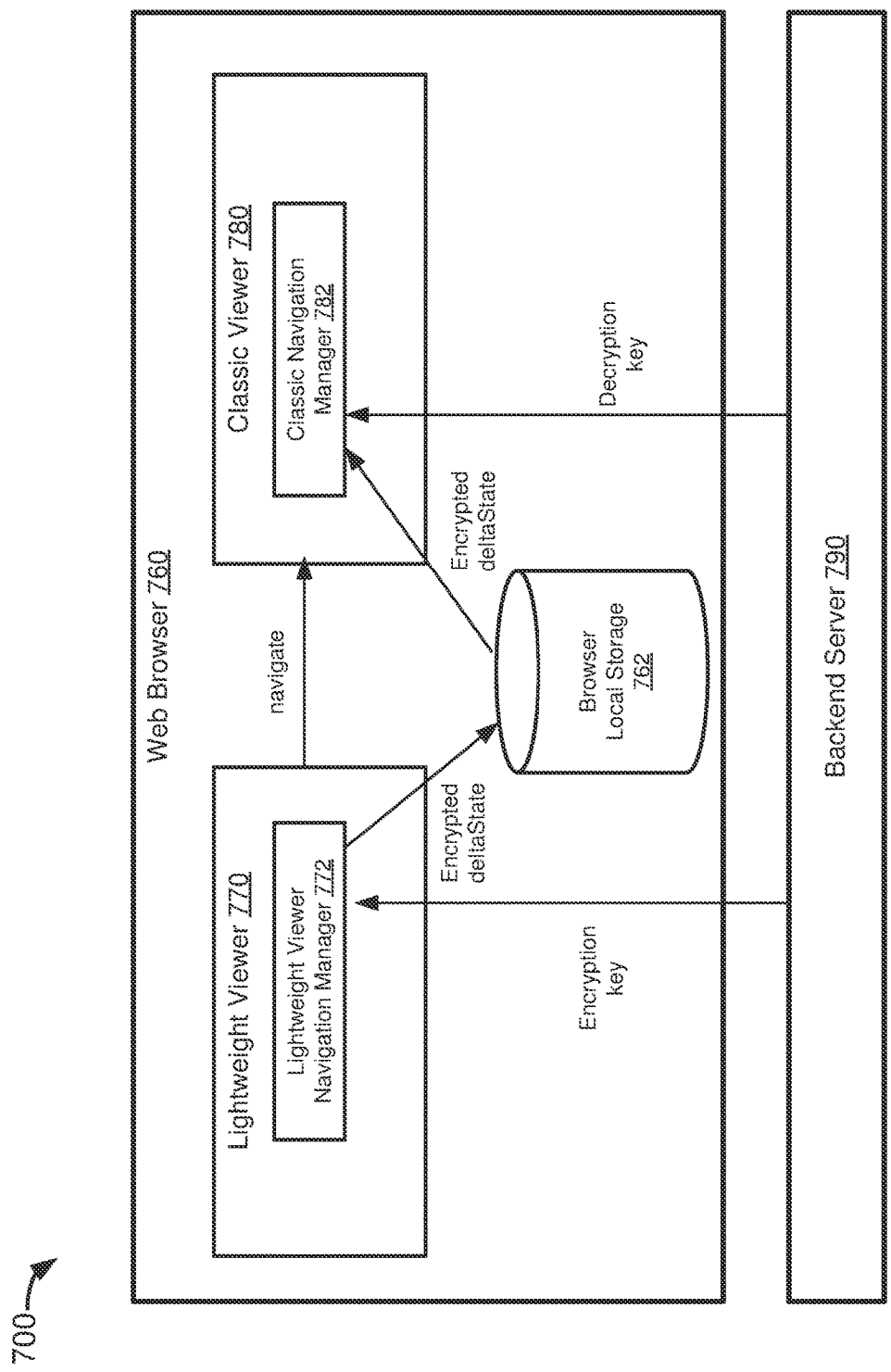
FIG. 7 shows a diagram of an architecture for maintaining state between a lightweight viewer web application and a classic viewer web application, according to an embodiment.
Figure 8:
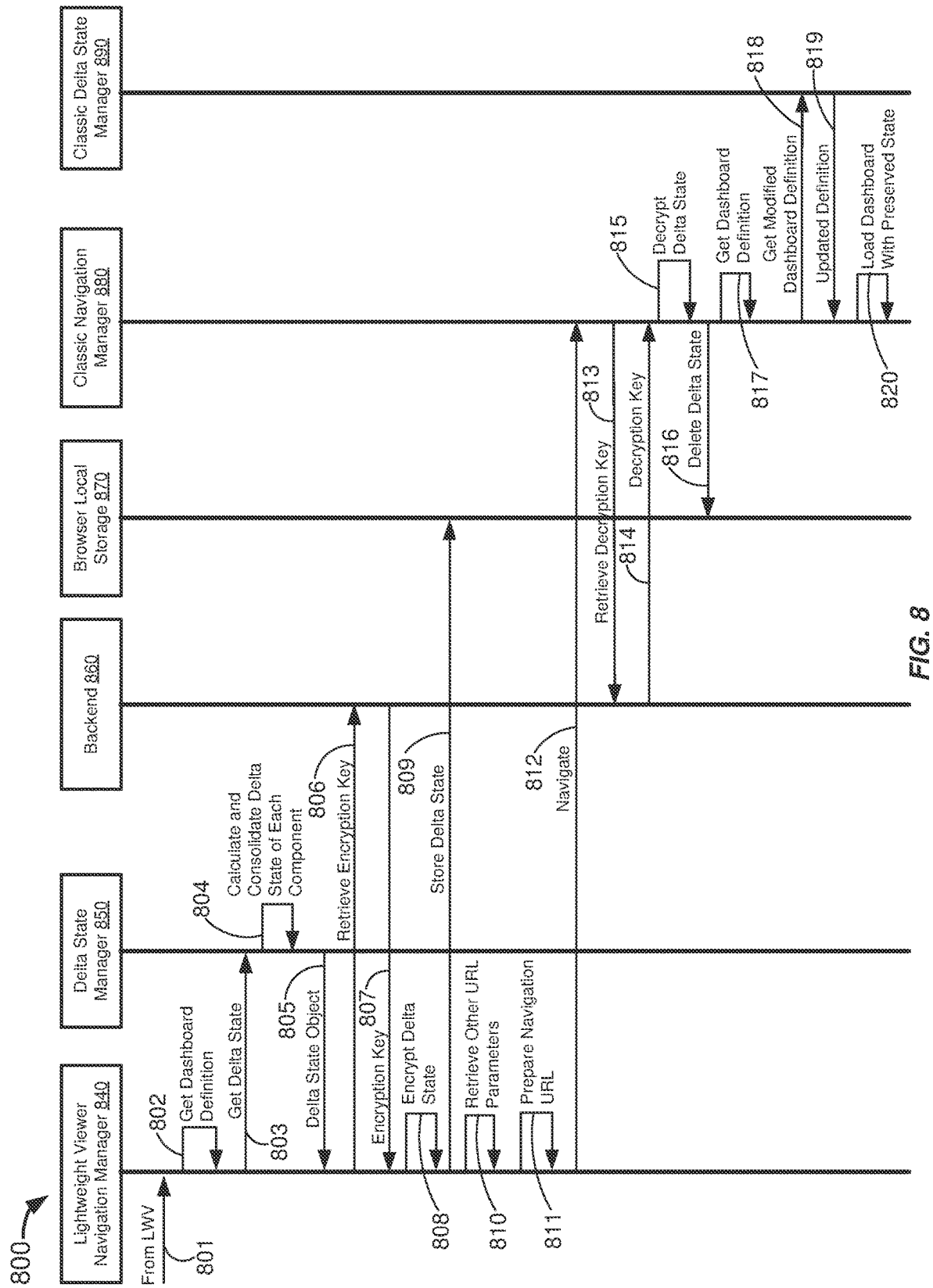
FIG. 8 shows an information flow diagram of maintaining state between web applications using an encrypted delta state object, according to an embodiment.

Examples of visualization dashboards are provided in FIGS. 3-6 and are described below. In particular, FIGS. 3 and 4 provide examples of a lightweight viewer and FIGS. 5 and 6 provide examples of a classic viewer. FIGS. 7 and 8 provide examples of an architecture and an information flow diagram, respectively, for maintaining state between web applications.

FIG. 3 shows an illustration 300 of a default state of a lightweight web application user interface including a dashboard, according to an embodiment. This dashboard shows product details and information about a discount given on various product categories. When a user opens this dashboard in the lightweight viewer, it shows the following data in the form of a chart 310.

From this chart 310, a user can visualize that more discount was given on juices. Now the user is interested to know the discount given on various juices, hence he will perform a drill-down operation on juices.

The illustration 300 of the lightweight web application user interface also includes a placeholder image 320 of a map along with an message indicating that this geographic map widget is not supported by the lightweight viewer: "Unsupported Widget: Geo Map".

The user interface also includes a navigation button 330 to navigate from the leightweight viewer to the classic viewer (shown in FIG. 5 and FIG. 6).

FIG. 4 shows an illustration 400 of a modified state of a lightweight web application user interface including a dashboard, according to an embodiment. The chart 420 shows information about the discount given on product categories after the user performs the drill down operation described above with respect to FIG. 3.

The illustration 400 of the lightweight web application user interface also shows a navigation button 430 that the user can select to navigate to the classic viewer web application.

The illustration 400 of the lightweight web application user interface also shows a filter button 460 that is shown in non-solid dashed lines to indicate that the functionality is not supported by the lightweight viewer. Further, when a user selects (e.g., hover, tap, click, etc.) the filter button 460 the user interface may present the message 440 indicating that the classic viewer can provide this functionality: "To enable the filter functionalities, please switch to Classic Viewer first." The message 440 also includes a hyperlink 450 to "Navigate to Classic Viewer."

From the chart 420, the user may navigate to the classic viewer (e.g., by selecting the button 430 or the hyperlink 450). As mentioned above the user may like for the context and modified state of the chart 420 to be maintained. Maintaining state would be advantageous as the user would not need to repeat the drill down operation.

For sake of comparison, FIG. 5 shows an illustration 500 of a default state of a classic web application user interface including a dashboard, according to an embodiment. This is the default state that would be shown if the user had opened the discount per product chart 530 in the classic viewer directly without first opening the lightweight viewer and modifying the dashboard from there before navigating to the classic viewer.

As mentioned before, the lightweight viewer did not support geographic maps and instead provided a placeholder 320 as shown in FIG. 3. However, the classic web application does support this functionality and the user interface shows the geographic map widget 510. In addition, the classic viewer web application also supports the filter functionality 540 (as indicated by solid lines), which was not supported by the lightweight viewer.

FIG. 6 shows an illustration 600 of a modified state of a classic web application user interface including a dashboard, according to an embodiment. Herein, the discount per product chart 640 is shown in the same modified state as the chart 420 of the lightweight viewer in FIG. 4. This modified state may be maintained between the two web applications using the techniques described above.

Further details of maintaining state between web application are described below along with an architecture diagram in FIG. 7 and an information flow diagram in FIG. 8.

FIG. 7 shows a diagram 700 of an architecture for maintaining state between a lightweight viewer 770 web application and a classic viewer 780 web application, according to an embodiment. These web applications are run by a web browser 760, which is run by a computer system. The lightweight viewer 770 web application includes a lightweight viewer navigation manager 772 software component. The classic viewer 780 includes a classic navigation manager 782 software component. These lightweight and classic navigation manager software components 772, 782 may access the browser local storage 176 to store and receive the delta state object, which may be encrypted.

The lightweight viewer 770 and the classic viewer 780 are two different applications working on the same data from the backend server 790. When the user navigates from lightweight viewer 770 to the classic viewer 780, the web browser 760 closes the lightweight viewer 770 application and opens the classic viewer 780 application in the same browser window. Before closing the lightweight viewer 770 application, the web browser 760 may capture the change in a state (i.e., delta) and keep it in the browser storage 762. When the classic viewer 780 application is opened, it retrieves the default story state from the backend server 790 and applies the delta which is kept by lightweight viewer 770 in the browser's local storage 762. So, this way the dashboard context is maintained. As soon as delta is applied to the dashboard, it is cleared and deleted from the browser's memory.

The delta state object stored in the browser local storage 762 may be encrypted by the lightweight navigation manager 772 using an encryption key obtained from the backend server 790. The encrypted delta state object is the delta state that is stored in the browser local storage 762. The backend server 790 may later send a decryption key to the classic navigation manager 782 such that it can decrypt the encrypted delta state object that was stored by the lightweight viewer navigation manager 772.

The generation of the delta state object and the encryption are further described below.

FIG. 8 shows an information flow diagram 800 of maintaining state between web applications using an encrypted delta state object, according to an embodiment. In the diagram 800, information flows between a lightweight viewer navigation manager 840, a delta state manager 850, a backend 860, a browser local storage 870, a classic navigation manager 880, and a classic delta state manager 890.

At 801, the lightweight viewer navigation manager 840 is instantiated when a user clicks on navigate button ("from LWV").

At 802, the lightweight viewer navigation manager 840 gets original/old dashboard definitions. These may be obtained from a unified store in some embodiments.

At 803, the lightweight viewer navigation manager 840 gets a delta state object from the delta state manager 850.

At 804, the delta state manager 850 instantiates a delta State object by reading the state of each component of the dashboard definition (e.g., from the unified store) and compares this with the initial state from the dashboard definition and creates a delta and adds this delta to the delta State object. The delta state manager 850 performs the above step for each component such that the complete delta will be formed.

At 805 the delta state object is provided to the lightweight viewer navigation manager 840 from the delta state manager 850

Now the delta state object may be stored in the browser cache but it may be encrypted first.

In some cases when a web application session is created, the backend 860 may create a unique key for that session. This key may be valid while the session is valid. Once the session has expired, this key may be removed from the backend 860.

At 806, the lightweight viewer navigation manager 840 sends a request to the backend 860 to get the encryption key.

At 807, the backend 860 sends the encryption key to the delta state manager 850.

At 808, the delta state manager 850 encrypts the delta state object using the encryption key.

At 809, the delta state manager 850 stores delta state object in local storage of browser 870.

At 810 the delta state manager 850 retrieves the other parameters like a page identifier, and which are not part of delta state object but are required to get the current state of the story. These parameter may be passed in the navigation URL.

At 811, the delta state manager 850 prepares the navigation URL of the classic viewer by adding all required URL parameters. The delta state manager 850 adds URL parameters 'navigatefromlwv=true', this is to inform the classic viewer to inform that the user has opened the data analytics application by navigating from the lightweight viewer.

At 812, the delta state manager 850 calls a navigation API and passes the navigation URL to open the Classic viewer application.

The classic viewer now instantiates the classic navigation manager 880 if the URL contains 'navigatefromlwv=true' or another identifier that the user has navigated from the lightweight viewer.

At 813, classic navigation manager 880 sends a request to the backend 860 to get the decryption key.

At 814, the backend 860 sends the decryption key to the classic navigation manager 880.

At 815, classic navigation manager 880 reads encrypted delta state object from local storage of browser and the classic navigation manager 880 decrypts delta state object using the decryption key.

At 816, the classic navigation manager 880 deletes the encrypted delta state from the browser.

At 817, the classic navigation manager 880 retrieves the dashboard definition.

At 818, the classic navigation manager 880 instantiates classic delta state manager 890 and passes the delta state and dashboard definition.

At 818, the classic delta state manager 890 navigates through the delta state and reads the state of each component and merges it into the story definition. This way the classic delta state manager 890 prepares the updated story definition which represents the state of the story that was there in the LWV at the time of the navigation.

At 819, classic delta state manager 890 passes the updated story definition to classic navigation manager 880.

At 820, the classic navigation manager 880 provides the state to the classic viewer which loads the dashboard with the same modified state as modified in the lightweight viewer. This is advantageous as the user does not need to repeat the same operations to get back to the same context and application state that they were in before navigating from the lightweight viewer to the classic viewer.

Example Hardware

Figure 9:
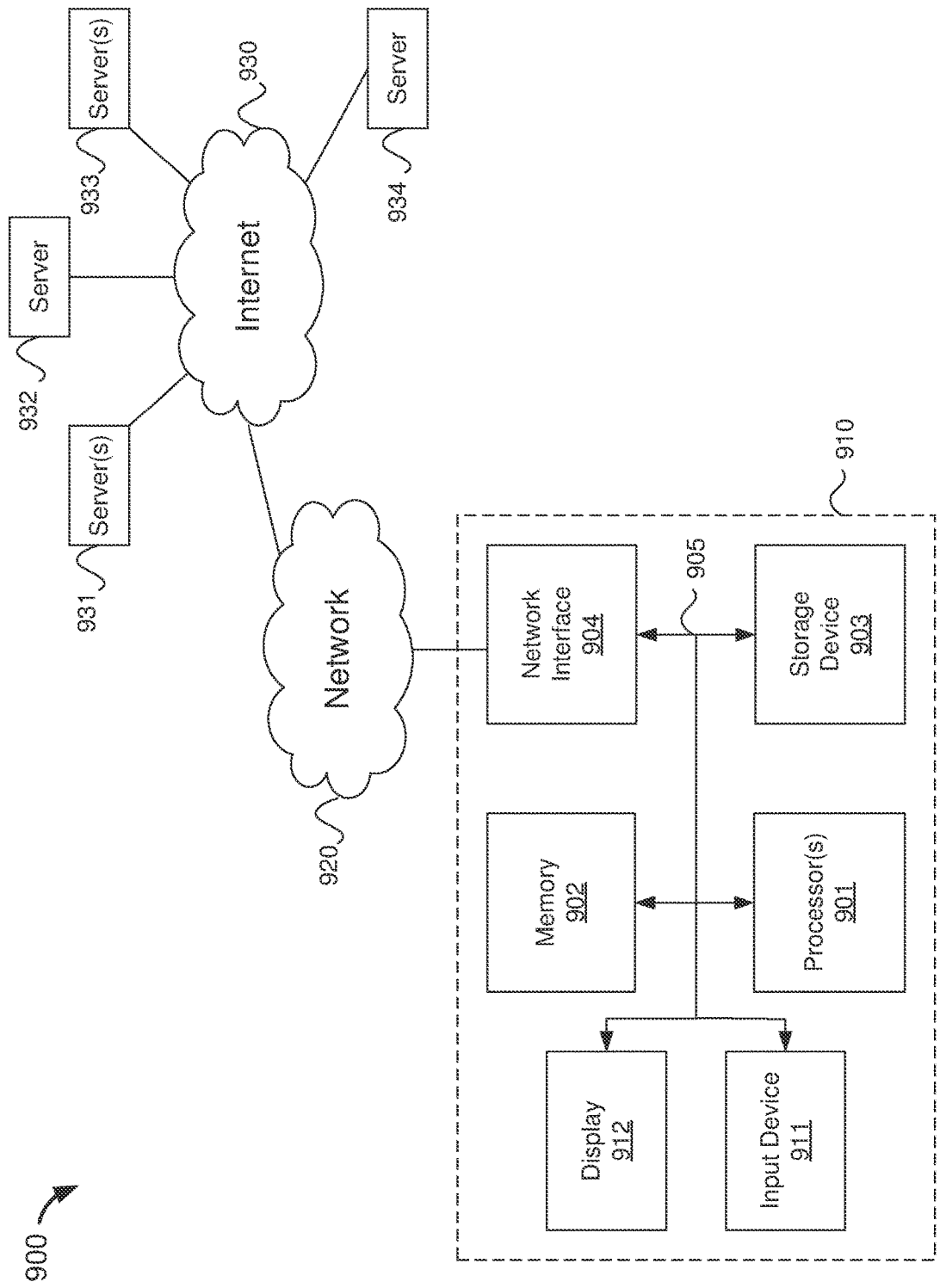
FIG. 9 shows a diagram of hardware of a special purpose computing machine for implementing systems and methods described herein.

FIG. 9 shows a diagram 900 of hardware of a special purpose computing machine for implementing systems and methods described herein. The following hardware description is merely one example. It is to be understood that a variety of computers topologies may be used to implement the above described techniques. The hardware shown in FIG. 9 may be used to implement the computer systems and computer software (computer reprogram code) described herein.

The computer system 910 includes a bus 905 or other communication mechanism for communicating information, and one or more processor(s) 901 coupled with bus 905 for processing information. The computer system 910 also includes a memory 902 coupled to bus 905 for storing information and instructions to be executed by processor 901, including information and instructions for performing some of the techniques described above, for example. This memory may also be used for storing programs executed by processor(s) 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 903 may include source code, binary code, or software files for performing the techniques above, for example. Storage device and memory are both examples of non-transitory computer readable storage mediums.

The computer system 910 may be coupled via bus 905 to a display 912 for displaying information to a computer user. An input device 911 such as a keyboard, touchscreen, and/or mouse is coupled to bus 905 for communicating information and command selections from the user to processor 901. The combination of these components allows the user to communicate with the system. In some systems, bus 905 represents multiple specialized buses, for example.

The computer system also includes a network interface 904 coupled with bus 905. The network interface 904 may provide two-way data communication between computer system 910 and a network 920. The network interface 904 may be a wireless or wired connection, for example. The network 920 may be a local area network or an intranet, for example. The computer system 910 can send and receive information through the network interface 904, across the network 920, to computer systems connected to the Internet 930. Using the Internet 930 the computer system 910 may access data and features that reside on multiple different hardware servers 931, 932, 933, 934. The servers 931-934 may be part of a cloud computing environment in some embodiments.

Additional Embodiments

Additional embodiments of the techniques for maintaining state between web applications are described below.

Some embodiments provide a computer system comprising one or more processors and one or more machine-readable medium coupled to the one or more processors. The one or more machine-readable medium storing computer program code comprising sets of instructions executable by the one or more processors to run a lightweight viewer of a web application in a web browser, the lightweight viewer providing a first user interface presenting a visualization dashboard including one or more visualizations of data. The computer program code further comprising sets of instructions executable by the one or more processors to obtain one or more user inputs that modify the visualization dashboard of the lightweight viewer to a modified state. The computer program code further comprising sets of instructions executable by the one or more processors to obtain user input for navigation to a classic viewer of the web application, the classic viewer providing one or more functions or abilities that are not provided by the lightweight viewer. The computer program code further comprising sets of instructions executable by the one or more processors to navigate to the classic viewer in the web browser, the classic viewer providing a second user interface presenting the visualization dashboard including the one or more visualizations of data. The computer program code further comprising sets of instructions executable by the one or more processors to modify the visualization dashboard of the classic viewer to the modified state based on the navigation from the lightweight viewer to the classic viewer and without user input to the classic viewer to modify the visualization dashboard to the modified state.

In some embodiments of the computer system, the one or more visualizations of data in the visualization dashboard are defined by a visualization definition, and wherein the one or more user inputs that modify the visualization dashboard to the modified state also modify the visualization definition to a modified visualization definition.

In some embodiments of the computer system, the computer program code further comprises sets of instructions executable by the one or more processors to: determine a delta state object by comparing the modified visualization definition to the visualization definition.

In some embodiments of the computer system, the computer program code further comprises sets of instructions executable by the one or more processors to retrieve, by the lightweight viewer, an encryption key from a server for the web application, encrypt, by the lightweight viewer, the delta state object using the encryption key to obtain an encrypted delta state object, store, by the lightweight viewer, the encrypted delta state object in a local browser storage, retrieve, by the classic viewer, a decryption key from the server for the web application, retrieve, by the classic viewer, the encrypted delta state object from the local browser storage, and decrypt, by the classic viewer, the encrypted delta state object using the decryption key to obtain the delta state object, wherein the modification of the visualization dashboard of the classic viewer to the modified state based on the navigation from the lightweight viewer to the classic viewer is based on the delta state object.

In some embodiments of the computer system, the first user interface of the lightweight viewer includes an indication that a specific functionality is not available in the lightweight viewer.

In some embodiments of the computer system, navigation to the classic viewer in the web browser includes an indication in a uniform resource locator that the navigation is from the lightweight viewer.

In some embodiments of the computer system, the navigation to the classic viewer in the web browser includes additional parameters of the visualization dashboard.

Some embodiments provide a non-transitory computer-readable medium storing computer program code. The computer program code comprises sets of instructions to run a lightweight viewer of a web application in a web browser, the lightweight viewer providing a first user interface presenting a visualization dashboard including one or more visualizations of data. The computer program code further comprises sets of instructions to obtain one or more user inputs that modify the visualization dashboard of the lightweight viewer to a modified state. The computer program code further comprises sets of instructions to obtain user input for navigation to a classic viewer of the web application, the classic viewer providing one or more functions or abilities that are not provided by the lightweight viewer. The computer program code further comprises sets of instructions to navigate to the classic viewer in the web browser, the classic viewer providing a second user interface presenting the visualization dashboard including the one or more visualizations of data. The computer program code further comprises sets of instructions to modify the visualization dashboard of the classic viewer to the modified state based on the navigation from the lightweight viewer to the classic viewer and without user input to the classic viewer to modify the visualization dashboard to the modified state.

In some embodiments of the non-transitory computer-readable medium, the one or more visualizations of data in the visualization dashboard are defined by a visualization definition, and wherein the one or more user inputs that modify the visualization dashboard to the modified state also modify the visualization definition to a modified visualization definition.

In some embodiments of the non-transitory computer-readable medium, the computer program code further comprises sets of instructions to determine a delta state object by comparing the modified visualization definition to the visualization definition.

In some embodiments of the non-transitory computer-readable medium, the computer program code further comprises sets of instructions to retrieve, by the lightweight viewer, an encryption key from a server for the web application, encrypt, by the lightweight viewer, the delta state object using the encryption key to obtain an encrypted delta state object, store, by the lightweight viewer, the encrypted delta state object in a local browser storage, retrieve, by the classic viewer, a decryption key from the server for the web application, retrieve, by the classic viewer, the encrypted delta state object from the local browser storage, and decrypt, by the classic viewer, the encrypted delta state object using the decryption key to obtain the delta state object, wherein the modification of the visualization dashboard of the classic viewer to the modified state based on the navigation from the lightweight viewer to the classic viewer is based on the delta state object.

In some embodiments of the non-transitory computer-readable medium, the first user interface of the lightweight viewer includes an indication that a specific functionality is not available in the lightweight viewer.

In some embodiments of the non-transitory computer-readable medium, the navigation to the classic viewer in the web browser includes an indication in a uniform resource locator that the navigation is from the lightweight viewer.

In some embodiments of the non-transitory computer-readable medium, the navigation to the classic viewer in the web browser includes additional parameters of the visualization dashboard.

Some embodiments provide a computer-implemented method comprising running a lightweight viewer of a web application in a web browser, the lightweight viewer providing a first user interface presenting a visualization dashboard including one or more visualizations of data, obtaining one or more user inputs that modify the visualization dashboard of the lightweight viewer to a modified state, obtaining user input for navigation to a classic viewer of the web application, the classic viewer providing one or more functions or abilities that are not provided by the lightweight viewer, navigating to the classic viewer in the web browser, the classic viewer providing a second user interface presenting the visualization dashboard including the one or more visualizations of data, and modifying the visualization dashboard of the classic viewer to the modified state based on the navigation from the lightweight viewer to the classic viewer and without user input to the classic viewer to modify the visualization dashboard to the modified state.

In some embodiments of the computer-implemented method, the one or more visualizations of data in the visualization dashboard are defined by a visualization definition, and wherein the one or more user inputs that modify the visualization dashboard to the modified state also modify the visualization definition to a modified visualization definition.

In some embodiments of the computer-implemented method, it further comprises determining a delta state object by comparing the modified visualization definition to the visualization definition.

In some embodiments of the computer-implemented method, it further comprises retrieving, by the lightweight viewer, an encryption key from a server for the web application, encrypting, by the lightweight viewer, the delta state object using the encryption key to obtain an encrypted delta state object, storing, by the lightweight viewer, the encrypted delta state object in a local browser storage, retrieving, by the classic viewer, a decryption key from the server for the web application, retrieving, by the classic viewer, the encrypted delta state object from the local browser storage, and decrypting, by the classic viewer, the encrypted delta state object using the decryption key to obtain the delta state object, wherein the modification of the visualization dashboard of the classic viewer to the modified state based on the navigation from the lightweight viewer to the classic viewer is based on the delta state object.

In some embodiments of the computer-implemented method, the first user interface of the lightweight viewer includes an indication that a specific functionality is not available in the lightweight viewer.

In some embodiments of the computer-implemented method, the navigation to the classic viewer in the web browser includes an indication in a uniform resource locator that the navigation is from the lightweight viewer, and wherein the navigation to the classic viewer in the web browser includes additional parameters of the visualization dashboard.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors;
one or more machine-readable medium coupled to the one or more processors and storing computer program code comprising sets of instructions executable by the one or more processors to:
run a lightweight viewer of a web application in a web browser, the lightweight viewer providing a first user interface presenting a visualization dashboard including one or more visualizations of data;
obtain one or more user inputs that modify the visualization dashboard of the lightweight viewer to a modified state;
obtain user input for navigation to a classic viewer of the web application, the classic viewer providing one or more functions or abilities that are not provided by the lightweight viewer;
navigate to the classic viewer in the web browser, the classic viewer providing a second user interface presenting the visualization dashboard including the one or more visualizations of data; and modify the visualization dashboard of the classic viewer to the modified state based on the navigation from the lightweight viewer to the classic viewer and without user input to the classic viewer to modify the visualization dashboard to the modified state.

2. The computer system of claim 1, wherein the one or more visualizations of data in the visualization dashboard are defined by a visualization definition, and wherein the one or more user inputs that modify the visualization dashboard to the modified state also modify the visualization definition to a modified visualization definition.

3. The computer system of claim 2, wherein the computer program code further comprises sets of instructions executable by the one or more processors to:
   determine a delta state object by comparing the modified visualization definition to the visualization definition.

4. The computer system of claim 3, wherein the computer program code further comprises sets of instructions executable by the one or more processors to:
   retrieve, by the lightweight viewer, an encryption key from a server for the web application;
   encrypt, by the lightweight viewer, the delta state object using the encryption key to obtain an encrypted delta state object;
   store, by the lightweight viewer, the encrypted delta state object in a local browser storage;
   retrieve, by the classic viewer, a decryption key from the server for the web application;
   retrieve, by the classic viewer, the encrypted delta state object from the local browser storage;
   decrypt, by the classic viewer, the encrypted delta state object using the decryption key to obtain the delta state object, wherein the modification of the visualization dashboard of the classic viewer to the modified state based on the navigation from the lightweight viewer to the classic viewer is based on the delta state object.

5. The computer system of claim 1, wherein the first user interface of the lightweight viewer includes an indication that a specific functionality is not available in the lightweight viewer.

6. The computer system of claim 1, wherein the navigation to the classic viewer in the web browser includes an indication in a uniform resource locator that the navigation is from the lightweight viewer.

7. The computer system of claim 1, wherein the navigation to the classic viewer in the web browser includes additional parameters of the visualization dashboard.

8. A non-transitory computer-readable medium storing computer program code comprising sets of instructions to:
   run a lightweight viewer of a web application in a web browser, the lightweight viewer providing a first user interface presenting a visualization dashboard including one or more visualizations of data;
   obtain one or more user inputs that modify the visualization dashboard of the lightweight viewer to a modified state;
   obtain user input for navigation to a classic viewer of the web application, the classic viewer providing one or more functions or abilities that are not provided by the lightweight viewer;
   navigate to the classic viewer in the web browser, the classic viewer providing a second user interface presenting the visualization dashboard including the one or more visualizations of data; and
   modify the visualization dashboard of the classic viewer to the modified state based on the navigation from the lightweight viewer to the classic viewer and without user input to the classic viewer to modify the visualization dashboard to the modified state.

9. The non-transitory computer-readable medium of claim 8, wherein the one or more visualizations of data in the visualization dashboard are defined by a visualization definition, and wherein the one or more user inputs that modify the visualization dashboard to the modified state also modify the visualization definition to a modified visualization definition.

10. The non-transitory computer-readable medium of claim 9, wherein the computer program code further comprises sets of instructions to:
    determine a delta state object by comparing the modified visualization definition to the visualization definition.

11. The non-transitory computer-readable medium of claim 10, wherein the computer program code further comprises sets of instructions to:
    retrieve, by the lightweight viewer, an encryption key from a server for the web application;
    encrypt, by the lightweight viewer, the delta state object using the encryption key to obtain an encrypted delta state object;
    store, by the lightweight viewer, the encrypted delta state object in a local browser storage;
    retrieve, by the classic viewer, a decryption key from the server for the web application;
    retrieve, by the classic viewer, the encrypted delta state object from the local browser storage;
    decrypt, by the classic viewer, the encrypted delta state object using the decryption key to obtain the delta state object, wherein the modification of the visualization dashboard of the classic viewer to the modified state based on the navigation from the lightweight viewer to the classic viewer is based on the delta state object.

12. The non-transitory computer-readable medium of claim 8, wherein the first user interface of the lightweight viewer includes an indication that a specific functionality is not available in the lightweight viewer.

13. The non-transitory computer-readable medium of claim 8, wherein the navigation to the classic viewer in the web browser includes an indication in a uniform resource locator that the navigation is from the lightweight viewer.

14. The non-transitory computer-readable medium of claim 8, wherein the navigation to the classic viewer in the web browser includes additional parameters of the visualization dashboard.

15. A computer-implemented method, comprising:
    running a lightweight viewer of a web application in a web browser, the lightweight viewer providing a first user interface presenting a visualization dashboard including one or more visualizations of data;
    obtaining one or more user inputs that modify the visualization dashboard of the lightweight viewer to a modified state;
    obtaining user input for navigation to a classic viewer of the web application, the classic viewer providing one or more functions or abilities that are not provided by the lightweight viewer;
    navigating to the classic viewer in the web browser, the classic viewer providing a second user interface presenting the visualization dashboard including the one or more visualizations of data; and
    modifying the visualization dashboard of the classic viewer to the modified state based on the navigation from the lightweight viewer to the classic viewer and without user input to the classic viewer to modify the visualization dashboard to the modified state.

16. The computer-implemented method of claim 15, wherein the one or more visualizations of data in the visualization dashboard are defined by a visualization definition, and wherein the one or more user inputs that modify the visualization dashboard to the modified state also modify the visualization definition to a modified visualization definition.

17. The computer-implemented method of claim 16, further comprising:
determining a delta state object by comparing the modified visualization definition to the visualization definition.

18. The computer-implemented method of claim 15, further comprising:
retrieving, by the lightweight viewer, an encryption key from a server for the web application;
encrypting, by the lightweight viewer, the delta state object using the encryption key to obtain an encrypted delta state object;
storing, by the lightweight viewer, the encrypted delta state object in a local browser storage;
retrieving, by the classic viewer, a decryption key from the server for the web application;
retrieving, by the classic viewer, the encrypted delta state object from the local browser storage;
decrypting, by the classic viewer, the encrypted delta state object using the decryption key to obtain the delta state object, wherein the modification of the visualization dashboard of the classic viewer to the modified state based on the navigation from the lightweight viewer to the classic viewer is based on the delta state object.

19. The computer-implemented method of claim 15, wherein the first user interface of the lightweight viewer includes an indication that a specific functionality is not available in the lightweight viewer.

20. The computer-implemented method of claim 15, wherein the navigation to the classic viewer in the web browser includes an indication in a uniform resource locator that the navigation is from the lightweight viewer, and wherein the navigation to the classic viewer in the web browser includes additional parameters of the visualization dashboard.

\* \* \* \* \*